(12) United States Patent
Ota et al.

(10) Patent No.: US 9,097,546 B2
(45) Date of Patent: Aug. 4, 2015

(54) TRAVELABLE AREA DISPLAY DEVICE

(75) Inventors: Satomi Ota, Ebina (JP); Hideyuki Kanno, Atsugi (JP); Kouji Satou, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/241,265

(22) PCT Filed: Jul. 9, 2012

(86) PCT No.: PCT/JP2012/067427
§ 371 (c)(1),
(2), (4) Date: Feb. 26, 2014

(87) PCT Pub. No.: WO2013/031382
PCT Pub. Date: Mar. 7, 2013

(65) Prior Publication Data
US 2014/0379253 A1    Dec. 25, 2014

(30) Foreign Application Priority Data
Aug. 31, 2011 (JP) ................. 2011-188123

(51) Int. Cl.
*G01C 21/34* (2006.01)
*G01C 21/36* (2006.01)
(52) U.S. Cl.
CPC ........ *G01C 21/3469* (2013.01); *G01C 21/3667* (2013.01)

(58) Field of Classification Search
USPC ........................................ 701/439
See application file for complete search history.

(56) References Cited

U.S. PATENT DOCUMENTS

| 6,434,482 B1 | 8/2002 | Oshida et al. |
| 6,864,807 B2 | 3/2005 | Todoriki et al. |
| 2003/0006914 A1 | 1/2003 | Todoriki et al. |
| 2010/0094496 A1 | 4/2010 | Hershkovitz et al. |
| 2010/0138098 A1* | 6/2010 | Takahara et al. ............ 701/29 |

FOREIGN PATENT DOCUMENTS

| JP | 2001-21376 A | 1/2001 |
| JP | 2002-202031 A | 7/2002 |
| JP | 2003-21522 A | 1/2003 |
| JP | 2010-169423 A | 8/2010 |
| WO | WO 2011/092729 A1 | 8/2011 |

OTHER PUBLICATIONS

European Extended Search Report, Feb. 20, 2015, 8 pages.

* cited by examiner

*Primary Examiner* — Mary Cheung
*Assistant Examiner* — Anna Mazzara
(74) *Attorney, Agent, or Firm* — Foley & Lardner LLP

(57) ABSTRACT

A travelable area display device according to the present invention is configured to compute a travelable distance from an optional spot, specify a feature spot which a driver can recognize on die basis of accumulated movement history information of a vehicle, and simultaneously display on a map in an in-vehicle screen a travelable area which is specified by the travelable distance, and the specified feature spot.

5 Claims, 5 Drawing Sheets

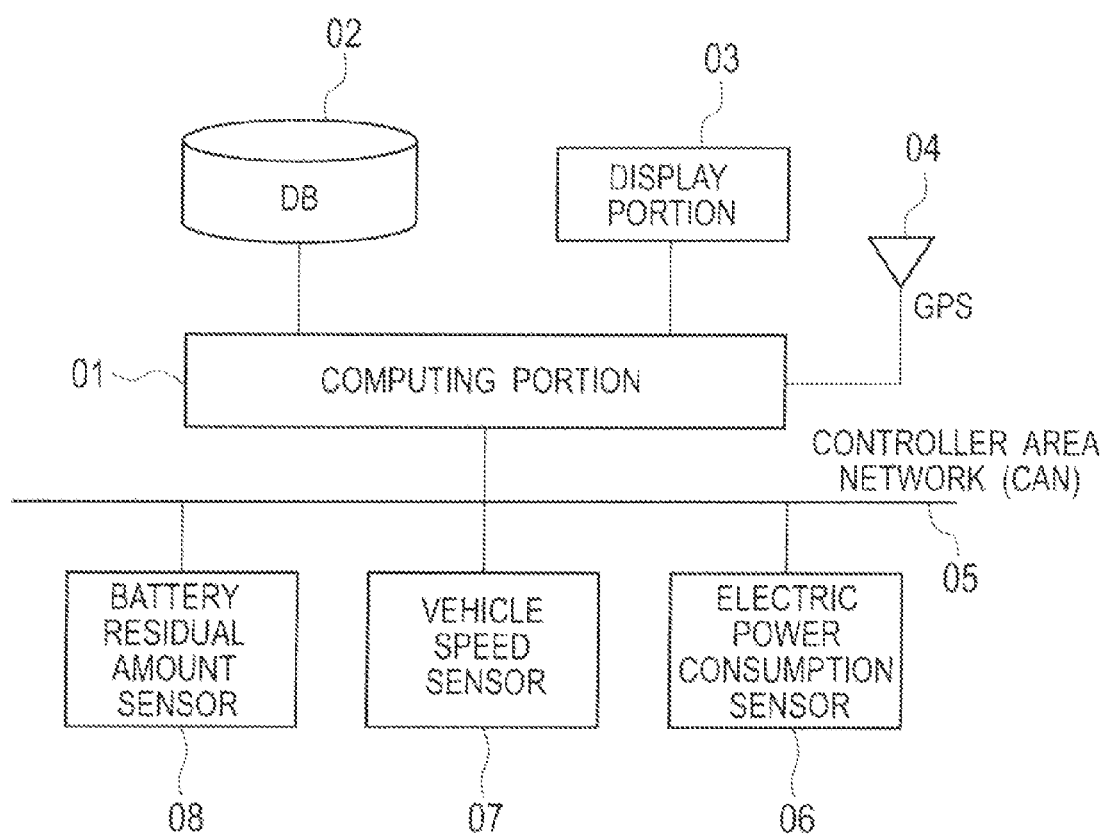

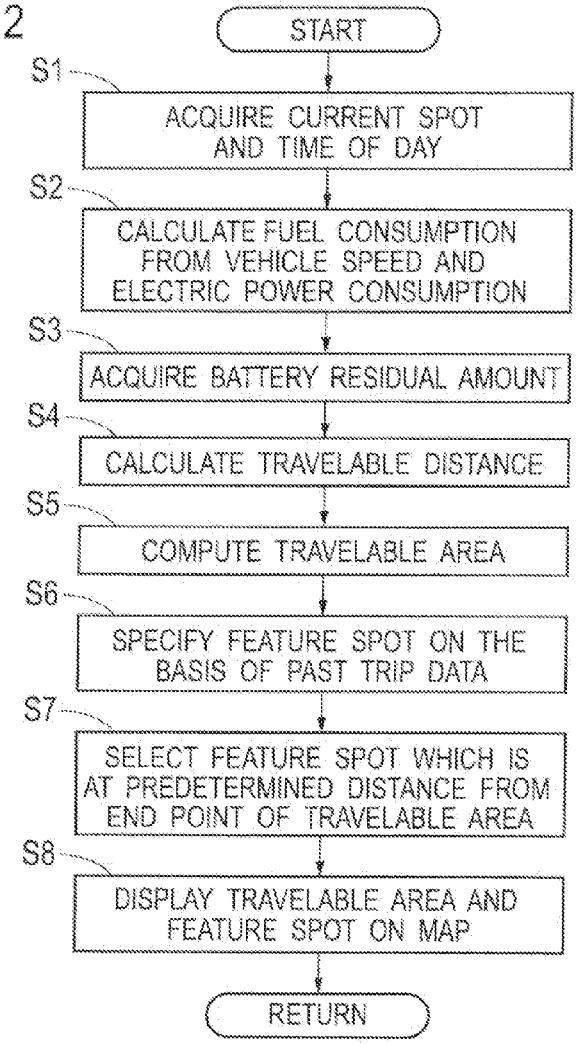

FIG. 2

- START
- S1: ACQUIRE CURRENT SPOT AND TIME OF DAY
- S2: CALCULATE FUEL CONSUMPTION FROM VEHICLE SPEED AND ELECTRIC POWER CONSUMPTION
- S3: ACQUIRE BATTERY RESIDUAL AMOUNT
- S4: CALCULATE TRAVELABLE DISTANCE
- S5: COMPUTE TRAVELABLE AREA
- S6: SPECIFY FEATURE SPOT ON THE BASIS OF PAST TRIP DATA
- S7: SELECT FEATURE SPOT WHICH IS AT PREDETERMINED DISTANCE FROM END POINT OF TRAVELABLE AREA
- S8: DISPLAY TRAVELABLE AREA AND FEATURE SPOT ON MAP
- RETURN

FIG. 3

| CURRENT POSITION | DAY OF WEEK | TIME ZONE | TRIP END POINT | AVERAGE ELECTRIC POWER USED AMOUNT | PROBABILITY OF BEING TRIP END SPOT |
|---|---|---|---|---|---|
| PERIPHERY OF OWN HOME | WEEKDAY | 7:00~7:30 | PLACE OF WORK | ···kw | 70% |
| ⋮ | ⋮ | ⋮ | ⋮ | ⋮ | ⋮ | ent
TRAVELABLE AREA DISPLAY DEVICE

TECHNICAL FIELD

The present invention relates to a travelable area display device displaying an area in which a vehicle can travel.

BACKGROUND ART

Patent Literature 1 discloses a technique of making a driver recognize a travelable area by computing a travelable distance on the basis of a fuel residual amount, a fuel consumption, etc. and displaying on a map a circular area with a computed travelable distance as a radius.

CITATION LIST

Patent Literature

Patent Literature 1: Japanese Patent Application Laid-Open Publication No. 2002-202013

SUMMARY OF INVENTION

Technical Problem

However, in the technique disclosed in the Patent Literature 1, in the case that the fuel residual amount is large, and the travelable distance is long, the circular area becomes wide and it is hard to viscerally grasp a range and an end point.

The present invention is made by focusing on the problem mentioned above, and has an object to provide a travelable area display device by which a driver can viscerally recognize a travelable area.

Solution to Problem

In order to achieve the object mentioned above, the travelable area display device according to the present invention is configured to compute a travelable distance from an optional spot, specify a feature spot which a driver can recognize on the basis of accumulated movement history information of a vehicle, and simultaneously display, on a map in an in-vehicle screen, a line map sectionalizing an inner side and an outer side of a travelable area specified by the travelable distance, and the specified feature spot which is displayed regardless of the inner side and the outer side of the line map.

Advantageous Effects of Invention

Accordingly, since the feature spot which die driver can recognize is displayed on the map as wed as the travelable area, the driver can viscerally grasp the travelable area.

BRIEF DESCRIPTION OF DRAWINGS

FIG. 1 is a schematic view showing a system configuration of a travelable area display device which is mounted on a vehicle according to Embodiment 1.

FIG. 2 is a flow chart showing a computing process in the travelable area display device according to Embodiment 1.

FIG. 3 is a view showing a counted example of trip data accumulated in a data base according to Embodiment 1.

Figure 4:
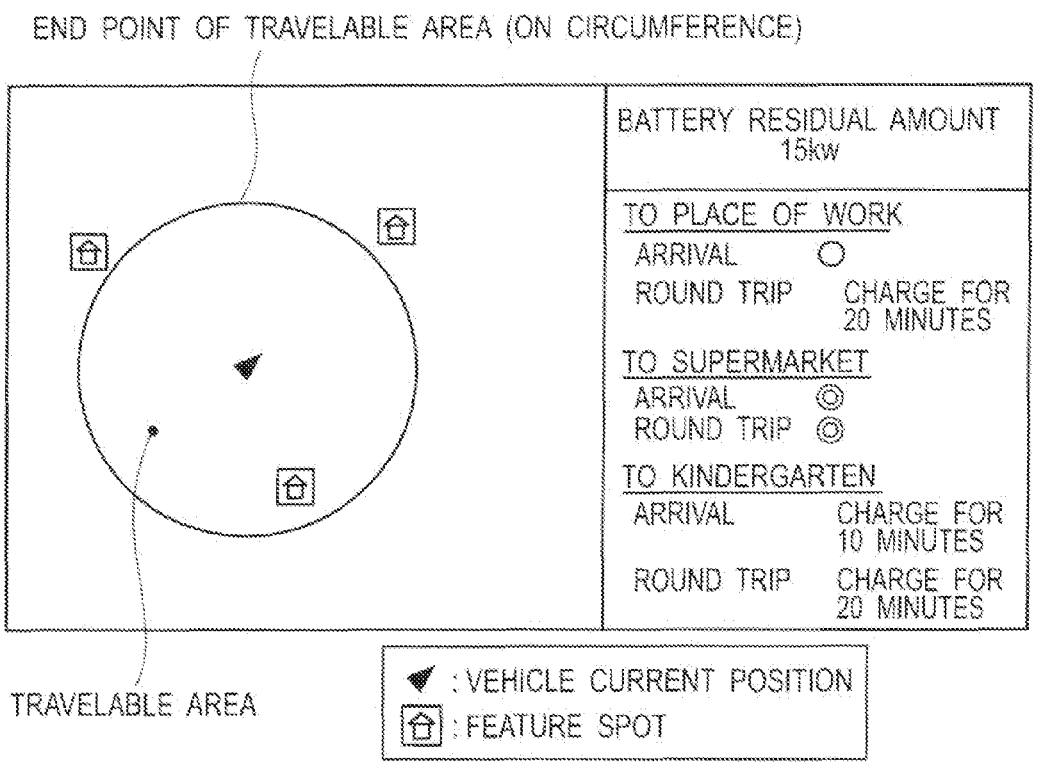
FIG. 4 is a schematic view showing a travelable area display state according to Embodiment 1.

REFERENCE SIGNS LIST 01 computing portion
02 data base (DB)
03 display portion
06 electric power consumption sensor
07 vehicle speed sensor
08 battery residual amount sensor

DESCRIPTION OF EMBODIMENTS

Embodiment 1

FIG. 1 is a schematic view showing a system configuration of a travelable area display device which is mounted on a vehicle according to Embodiment 1. The vehicle according to Embodiment 1 is an electric vehicle having a drive motor driven by a battery as a drive source, and to all of the drive motor and the other electric in-vehicle devices electric power is supplied from the battery. The travelable area display device has a computing portion 01 which executes a main computation. A data base 02, in which spots am statistically accumulated where a driver traveled in the past, is connected to the computing portion 01 so that information is transmittable. A display portion 03 is an in-vehicle monitor which simultaneously displays a travelable area and the like corresponding to results of computation of the computing portion 01 together with a map and the like. A GPS 04 is a global positioning sensor and acquires time of day and positional information of its own vehicle so as to output them to the computing portion 01. The computing portion 01 is connected to a controller area network (CAN) 05, and is configured such that information can be transmitted and received among an electric power consumption sensor 06, a vehicle speed sensor 07 and a battery residual amount sensor 08 which are similarly connected to the controller area network (CAN) 05.

FIG. 2 is a flow chart showing a computing process in the travelable area display device according to Embodiment 1. Note that, according to the process, the display on the map is started by the driver pressing a travelable area display button (not shown), the computation may be started at a stage where the button is pressed, or the above-described computation may be previously executed and displayed at the stage where die button is pressed. Note that, the button may be provided as a hardware switch, or may be displayed as a touch panel type on an in-vehicle screen.

A step S1 acquires the current, position and the time of day information from the GPS 04.

A step S2 calculates the fuel consumption on the basis of sensor values of the electric power consumption sensor 06 and the vehicle speed sensor 07. Specifically, the step computes what degree of travel distance is travelable per unit electric power in the case that the current electric power consumption is continued at the current vehicle speed.

A step S3 acquires a battery residual amount from the battery residual amount sensor 08.

A step S4 calculates a travelable distance from the fuel consumption in the step S2 and die battery residual amount in the step S3. Specifically, the step calculates the travelable distance by integrating the battery residual amount and the travel, distance per unit electric power.

A step S5 computes a travelable area. Specifically, the step draws a circle with a travelable distance as a radius and a center as the current own vehicle position, and computes while setting an inside of its circumference to the travelable area and an outside of the circumference to a non-travelable area.

A step S6 specifies a feature spot on the basis of the past trip data accumulated in the data base 02.

A step S7 selects the feature spot which is at a predetermined distance from an end point of the travelable area.

A step S8 displays on the map the travelable area and the feature spot.

[Computation of Travelable Area]

A description will be given of the computation of the travelable area which is carried out in the above-described step S5. The travelable area is calculated from the battery residual amount, and the travelable distance computed from the vehicle speed and the electric power consumption, and is set as a circular shape with the current position as a center and a radius as the travelable distance. Note that, the travelable area is not limited to the code, but may be displayed using a method such as an oval shape, a polygonal shape or a line, and the method is not particularly limited. Further, the travelable distance may be obtained by acquiring traffic information and slope information and calculating on the basis of an electric power amount computed per road, for improving a precision of computation.

[Specifying of Feature Spot]

A description will be given of the specifying of foe feature spot which is carried out in the above described steps S6 and S7. The feature spot specifies the following spots. Note that, registered spots and target spots mean spots which are set in a navigation system 1) Registered spots which are registered in the navigation system 2) Spots which have been set as the target spots a predetermined number of times or more from the current position 3) Spots which have been visited a predetermined number of times or more from the current position, but are not set as the target spots 4) Spots which are included in a history of target spot setting and have been visited within the previous predetermined days 5) Spots which have been once visited with the same degree of battery residual amount as the current battery residual amount 6) Spots which have been visited with a predetermined electric power The current position used, here is a concept which includes a peripheral area, for example, positions within a predetermined distance from the position of its own vehicle, in specifying the feature spot the data base is referred to which retains the spots which have been visited in the past. In the data base 02, trip data such as a start spot, a day of the week, a time zone, a target spot (a trip end spot), an average electric power used amount, a probability of being a trip end spot are accumulated, and the trip data are counted, for example, as shown in FIG. 3. FIG. 3 is a view showing a counted example of the trip data accumulated in the data base according to Embodiment 1, Mote that the trip data may be retained within the data, base 02, or may be retained within a server such as an information, center which can exchange the information by communication with the data base 02.

In the case that the travelable area is displayed, the feature spot satisfying the condition mentioned above is specified. In the case that a plurality of feature spots exists, the probability that the arriving spot is used for each of the current position, the time of day; the day of the week and the time zone, etc., and the spots having the probabilities of a predetermined percent or more, or the maximum predetermined number of spots having the higher possibilities may be narrowed down as the feature spots. Further, in the case that the feature spots are within a fixed distance or the case that the feature spots are in the same direction, the spots having the higher possibilities may have priority. In addition, the spots within a fixed distance than the end point (on the circumference) of the travelable area may have priority.

Further, in the case that the trip end spots cart not be specified for the current position, the time of day, the day of the week and the time zone, etc. . . . the feature spots accumulated as the hip end spots for the other current position, time of day, day of the week and time zone within a radius of N km (N is a predetermined value) from the current position may be displayed. Alternatively, a landmark or the like may be displayed. Further, the spots which have been once visited with the current battery residual amount may be displayed. Or every battery residual amount, the spots which have been visited may be accumulated statistically, and the spots may be statistically displayed every battery residual amount.

[Display Method]

A description will be given of a method of displaying the travelable area and the feature spots in the above described step S8. FIG. 4 is a schematic view showing a travelable area display state according to Embodiment 1. The feature spots are displayed by using an icon and a wording describing the feature spot. Further, the icon and the wording may be editable by the driver, or may be the information (icons, names of facilities and names of regions) retained in the map or the information center. In the case that a plurality of feature spots is simultaneously displayed, a size and a color of the icon may be changed according to a position or a direction, a distance from the current position, a battery used amount or an arrival probability, and a probability of being the trip end spot. Further, the number of the displayed feature spots may be decided according to a reachable distance, square measure of the travelable area, a direction of the spot and a scale of the map. Further, as shown in FIG. 4, usability is further improved by displaying the feature spots as the wording in the order of higher probability, and simultaneously displaying the current battery residual amount the probability of arriving at the feature spot, and a necessary charging time. etc. in the non-reachable case.

A description will be given here of an effect obtained by displaying as mentioned above while exemplifying a specific example. For example, a description will be given of a case that the driver determines whether or not the driver can reach a place of work from his or her home with the current battery residual amount. For example, in the case of a system which simply displays a travelable area without specifying the feature spots, it is necessary to determine whether or not the place of work is within the travelable area by first of all pressing the travelable area display button, moving the map in the direction where the place of work exists, and enlarging the vicinity of the place of work. In other words, since plural times of operations are necessary, it is hard to viscerally make determination.

On the contrary, in the travelable area display device according to Embodiment 1, since the place of work is the destination which is visited nearly every day, and is the spot where the probability of being the trip end spot is extremely high, the place of work is extracted as the feature spot. Accordingly, the place of work is displayed as the icon only by pressing the travelable area display button once, and it is possible to quickly determine on the screen whether or not the icon is within the travelable area. In other words, it is possible to viscerally determine with one operation whether or not the place of work is within the travelable area.

As described above, the following operations and effects can be obtained in Embodiment 1.

(1) Embodiment 1 is provided with the step S4 (travelable distance computing unit) which computes the travelable distance from the current position (the optional spot), the data base 02 (accumulating unit) which accumulates the movement history information of the vehicle, the step S6 (feature spot computing unit) which specifies the feature spot which the driver can recognize on the basis of the accumulated movement history information, and the step S8 (display unit) which simultaneously displays on the map within the in-vehicle screen the travelable area specified by the step S4, and the feature spot specified by the step S6.

Accordingly, the driver can viscerally grasp the travelable area, the end point thereof and the spot which can not be reached, and the like by simultaneously displaying the spots and the roads which the driver well knows.

(2) The step S8 displays while sectionalizing an inner side and an outer side of the travelable area, by a line map, and displays the feature spots regardless of the inner side and the outer side of the line map.

Accordingly, the driver can recognize the travelable area using as a landmark the feature spot that the driver well recognizes, and can more vsseeraiiy grasp the travelable area.

(3) The step S8 displays the feature spots which are within a predetermined distance from the area end portion of the travelable area.

As a result, it is possible to exclude the feature spots which cars be apparently traveled and the feature spots which can not be apparently traveled, and it is possible to viscerally grasp the position, of the end portion of the travelable area on the basis of the feature spot.

Embodiment 2

Figure 5:
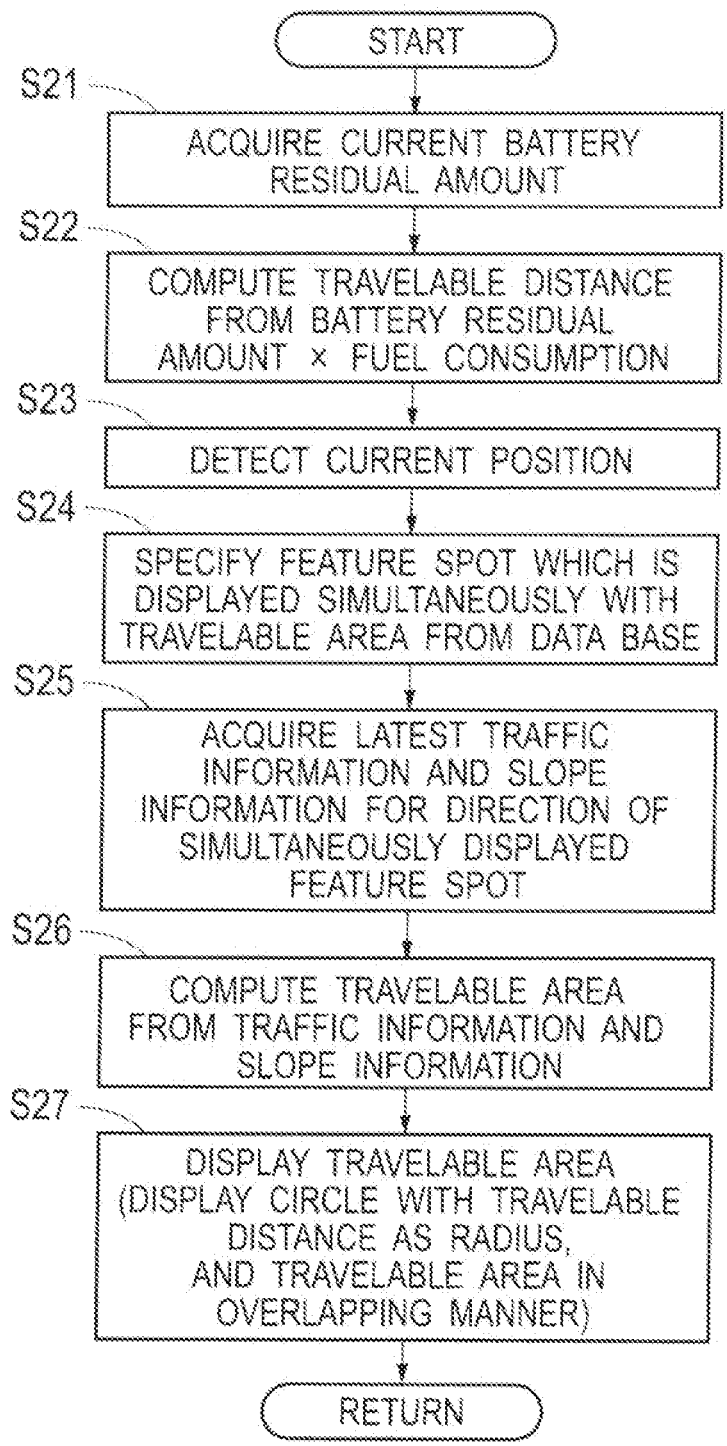
FIG. 5 is a flow chart showing a computing process in a travel able area display device according to Embodiment 3.

Next, a description will be given of Embodiment 2. Since a basic configuration is the same as Embodiment 1, a description will be given only of different points. FIG. 5 is a flow chart showing a computing process in a travelable area display device according to Embodiment 2.

A step S21 acquires a battery residual amount from the battery residual amount sensor 08.

A step S22 calculates fuel consumption on the basis of the sensor values of the electric power consumption sensor 06 and the vehicle speed sensor 07. Specifically, the step computes what degree of travel distance the vehicle can travel per rout electric power, in the case that the current electric power consumption is continued at the current vehicle speed. Further, the travelable distance is calculated by integrating the battery residual amount and the travel distance per unit electric power.

A step S23 acquires the current position and the time of day information from the GPS 04.

A step S24 specifies the feature spot on the basis of the past trip data which are accumulated in the data base 02.

A step S25 acquires the latest traffic information and slope information for the direction of the feature spot.

A step S26 computes a first travelable area on the basis of the travelable distance which is calculated in the step S22, and computes a second travelable area on the basis of the information which is acquired in the step S25. Specifically, the step draws a circle with the travelable distance as a radius, and the current own vehicle position as a center; and an inner side of the circumference is set to the first travelable area. Further, the step calculates the travelable area having a high precision on the basis of the traffic information and the slope information in the direction of the feature spot, and defines as the second travelable area the area which can be reached on the assumption that the area does not widely deviate from a line connecting the current, position and the feature spot.

A step S27 displays the first, and second travelable areas and the feature spot on the map.

[Specifying of Second Travelable Area]

Figure 6:
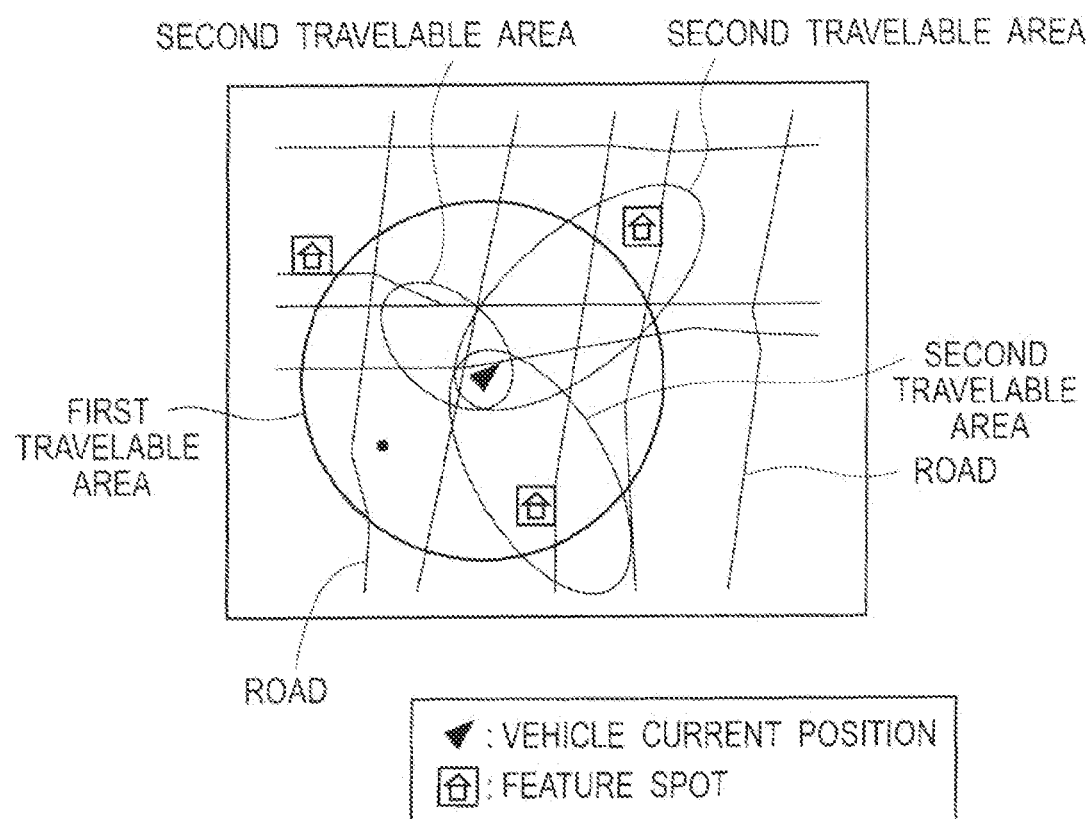
FIG. 6 is a schematic view showing a first and a second travelable area display state according to Embodiment 2.

Since the specifying of the feature spot and the specifying of the first travelable area are the same as in Embodiment 1, a description will be given of the specifying of the second travelable area. FIG. 6 is a schematic view showing a state of displaying the first and second travelable areas according to Embodiment 2.

In order to improve a precision of estimating the travelable area, there exists a system which calculates a necessary electric power amount per road link, while taking into consideration the traffic condition and the slope condition. However, calculated amount is great, and an enormous calculation is necessary in the case that all the directions are set to a range of calculation for the current position.

Accordingly, as a method of reducing the amount of calculation, the electric power consumption is calculated per road link, only in the direction, where the feature spots displayed simultaneously exist, and the other directions are displayed as the first travelable area for which the amount of calculation is small.

In other words, since it is conceivable that, the target, spot is set in the navigation system for the spot which the driver seldom visits and the spot which the driver visits for the first, time, the computation may be carried out accurately along the route. However, the target spot is not particularly set to the spot which the driver often visits, and it is necessary to compute over all the directions in this case. On the other hand, since it is highly likely that the driver goes to the feature spot in the case that the target spot is not particularly set, it is possible to display the travelable area having the high precision along the needs of the driver with the small amount of computation, by carrying out the computation having the high precision with the feature spot as a target.

Although the description has been given above of the present invention on the basis of the above-described embodiments, the present invention is not limited to the embodiments, but the other configurations are included in the present invention. In the embodiments, the description has been given of the electric vehicle which travels by using the electric power of the battery, but the present invention can be similarly applied to a vehicle which uses a liquid fuel, such as a gasoline.

The invention claimed is:

1. A travelable area display device comprising:
an accumulating database configured to accumulate movement history information of a vehicle;
a computing portion configured to
compute a travelable distance from a current spot, and
specify a feature spot recognizable to a user based on the accumulated movement history information; and
a display portion configured to
simultaneously display, on a map in an in-vehicle screen, a line map sectionalizing an inner side and an outer side of a travelable area which is specified by the computing portion, and the feature spot which is specified by the computing portion, and
display the feature spot regardless of the inner side and the outer side of the line map.

2. The travelable area display device according to claim 1, wherein the display portion is configured to display the feature spot within a predetermined distance from an area end portion of the travelable area.

3. A travelable area display method comprising:

computing a travelable distance from a current spot;

accumulating movement history information of a vehicle;

specifying a feature spot recognizable to a user based on the accumulated movement history information; and simultaneously displaying, on a map in an in-vehicle screen, a line map sectionalizing an inner side and an outer side of a travelable area which is specified by the computed travelable distance, and the specified feature spot, wherein the feature spot is displayed regardless of the inner side and the outer side of the line map.

4. The travelable area display device according to claim 1, wherein the accumulating database is configured to store information relating to at least one of a spot registered in a navigation system, a spot set by the user as a target spot for a predetermined number of times from a given position, a spot visited at least a predetermined number of times from a given position without being set as a target spot, a spot captured in the accumulated movement history information within a predetermined number of days beforehand, a spot to which the vehicle has traveled with a residual battery amount equivalent to a current battery residual amount, and a spot visited with a predetermined electric power.

5. The travelable area display device according to claim 1, wherein the computing portion is configured to compute the travelable distance based on traffic information and slope information.

* * * * *